United States Patent [19] [11] Patent Number: 5,144,834
Sano et al. [45] Date of Patent: Sep. 8, 1992

[54] SYSTEM FOR SIMULATING POWER PLANT OF AUTOMOTIVE VEHICLE UTILIZING ELECTRICALLY POWERED HIGH INERTIA POWER PLANT

[75] Inventors: Kaoru Sano; Fumio Mizushina; Takashi Goto; Toshimitsu Maruki, all of Shizuoka; Yukio Naganuma, Tokyo, all of Japan

[73] Assignee: Kabushiki Kaisha Meidensha, Japan

[21] Appl. No.: 618,952

[22] Filed: Nov. 28, 1990

[30] Foreign Application Priority Data

Nov. 30, 1989 [JP] Japan ................................. 1-310882
Nov. 30, 1989 [JP] Japan ................................. 1-310887
Nov. 30, 1989 [JP] Japan ................................. 1-310888

[51] Int. Cl.$^5$ .......................................... G01M 15/00
[52] U.S. Cl. ................................................ 73/118.1
[58] Field of Search ................. 73/118.1, 162, 865.6, 73/865.9

[56] References Cited
U.S. PATENT DOCUMENTS 4,468,958  9/1984  Takeshita ............................ 73/118.1
4,758,967  7/1988  Shmuter et al. .................... 364/550

FOREIGN PATENT DOCUMENTS 0010625   1/1983  Japan .................................. 73/118.1
58-38833  3/1983  Japan .
61-53541  3/1986  Japan .
0115738   4/1990  Japan .................................. 73/118.1
63-148309 5/1990  Japan .

Primary Examiner—Robert Raevis
Attorney, Agent, or Firm—Ronald P. Kananen

[57] ABSTRACT

A simulation system for an automotive internal combustion engine is suitable for simulating an engine operation for performing a bench test for an engine associated vehicular component, such as an automatic power transmission, an automatic transaxle, a differential gear box, and so forth. The system comprises a power plant which incorporates a relatively high inertia, and means for compensating the high inertia for achieving a low inertia equivalent to the automotive internal combustion engine; an engine characteristics generator receiving predetermined engine operation parameter simulated data for deriving a control signal commanding an output torque of said power plant according to a predetermined engine output torque variation characteristic which is set in terms of said engine operation parameter simulated data, and means, responsive to a simulated engine environmental condition indicative data, for deriving a correction value based on said environmental condition for correcting said control signal.

15 Claims, 6 Drawing Sheets

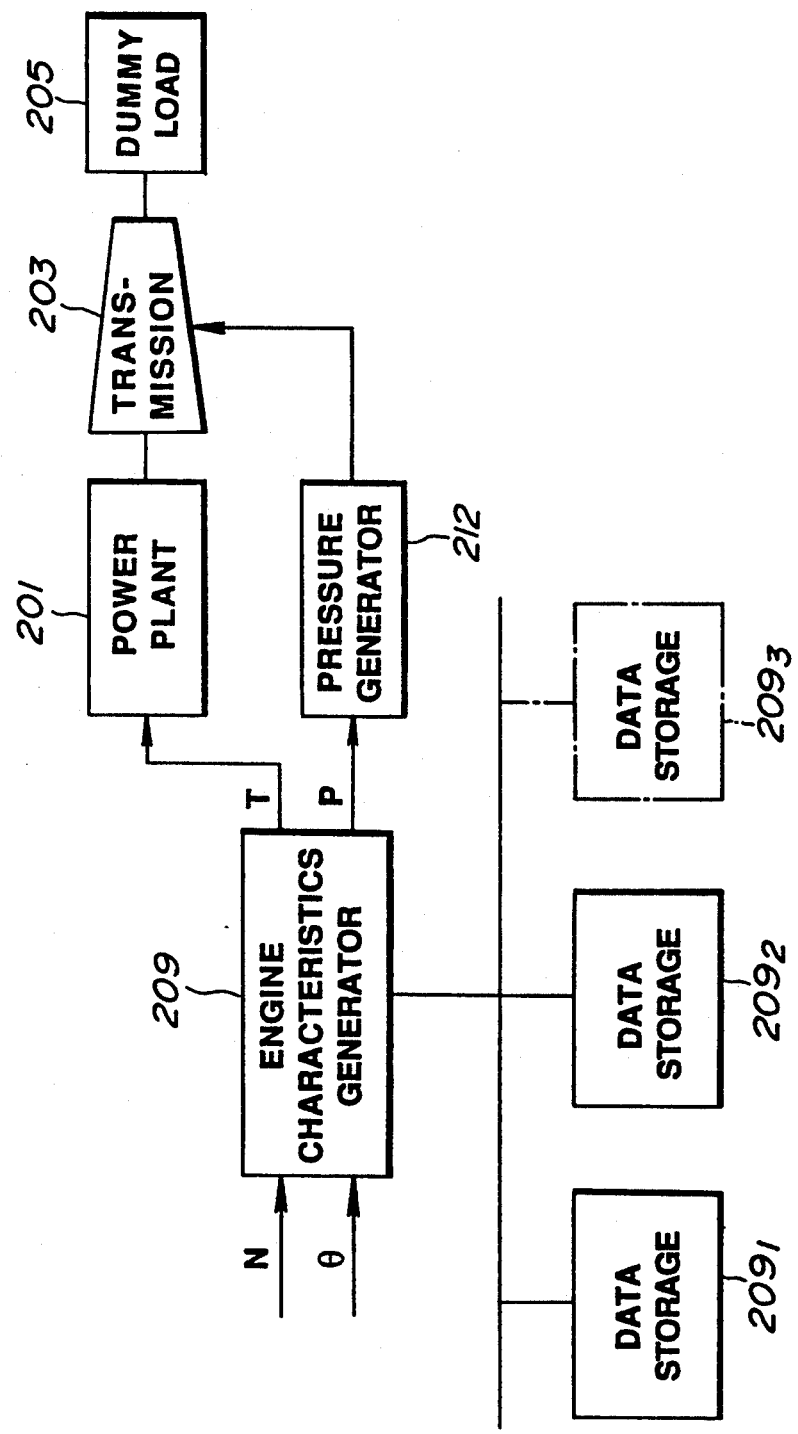

SYSTEM FOR SIMULATING POWER PLANT OF AUTOMOTIVE VEHICLE UTILIZING ELECTRICALLY POWERED HIGH INERTIA POWER PLANT

BACKGROUND OF THE INVENTION

1. Field of the Invention

The invention relates generally to a simulation system for an automotive power plant, such as an internal combustion engine, for testing automotive components, such as an automatic power transmission. More specifically, the invention relates to an automotive power plant simulation system utilizing an electrically powered high inertia power plant, such as an electric motor, which is suitable for bench testing automotive components, such as an automatic power transmission.

2. Description of the Background Art

Japanese Patent First (unexamined) Publications (Tokkai) Showa 58-38833 and 61-53541 disclose bench testing systems for automatic power transmission. In the disclosed system, an electric motor, a hydrostatic motor and so forth, are employed as substitute power plants in place of an automotive internal combustion engine. As can be appreciated, because of much higher inertia of the electric motor, hydrostatic motor and other substitute power plants in comparison with the automotive internal combustion engines, the substitute power plant is combined with speed increasing devices. Such automotive engine simulation system is useful for durability testing, static characteristics testing and so forth. However, due to the substantially high inertia moment, it is practically difficult to simulate transition characteristics at transmission speed ratio shifting and so forth. For instance, the electric motor has approximately 10 times higher inertia magnitude than that of the automotive engine.

For designing automatic power transmissions with enhanced shift feeling, reduced shift shock and so forth, it is essential to obtain data of the transition characteristics of power plant to be actually combined with the test transmission.

Therefore, Tokkai Showa 61-53541 as identified above, employs a strategy of a correction of command current for the electric motor. With the corrected command current, the output torque of the electric motor becomes substantially corresponding to the engine output torque to be output in response to a torque demand. Such an approach is generally successful in avoiding influence of high inertia of the high inertia power plant.

In the practical simulation, the automotive engine is simulated in terms of given parameters, such as an engine speed, a throttle valve open angle and so forth. Namely, in order to simulate the automotive engine transition characteristics for performing a bench test of an automatic power transmission, an engine speed and a throttle valve open angle are used as parameters for simulation. Therefore, an engine characteristics generator sets torque demand in terms of the engine speed indicative signal and a throttle valve open angle indicative signal to control the high inertia power plant, i.e. electric motor. When shift control parameters for controlling a shifting transmission gear ratio in the automatic power transmission is common to those used for simulating the engine characteristics, such approach is successfully introduced for performing a bench test. However, on the other hand, when the shift control parameters are different from those utilized for simulating the engine characteristics, difficulty is encountered in performing such a bench test. Therefore, it is desirable to provide a simulated engine characteristics generator which can perform a bench test of the automatic power transmissions irrespective of the shifting control parameters thereof.

On the other hand, in case that the shift control system of the automatic power transmission employs an intake air pressure as one of the shift control parameters, it becomes necessary to provide a simulated intake air pressure indicative data corresponding to the simulating condition of the engine.

Furthermore, in the modern and advanced automatic transmission technologies, a transmission gear ratio shifting pattern and/or shifting schedule is set and is variable depending upon various additional parameters. For instance, sometimes in the shift control system, it becomes necessary to provide data simulating an environmental condition, such as atmospheric pressure which is variable depending upon altitude. Since the intake air density to be introduced into the automotive engine is variable for causing variation of the engine output characteristics, some of the environmental conditions also affect the engine output characteristics. Therefore, for such type of the automatic power transmission, it becomes essential to simulate engine characteristics with the environmental condition indicative parameter or parameters as simulation parameter or parameters.

SUMMARY OF THE INVENTION

Therefore, it is an object of the present invention to provide a simulation system for simulating an automotive engine characteristic which enables a bench test for engine associated vehicular components, such as an automatic power transmission, irrespective of control parameters set for controlling the vehicular components.

According to one aspect of the invention, a simulation system for an automotive internal combustion engine, comprises:

a power plant which incorporates a relatively high inertia, and means for compensating the high inertia for achieving a low inertia equivalent to the automotive internal combustion engine;

an engine characteristics generator receiving predetermined engine operation parameter simulated data for deriving a control signal commanding an output torque of the power plant according to a predetermined engine output torque variation characteristic which is set in terms of the engine operation parameter simulated data; and means, responsive to a simulated engine environmental condition indicative data, for deriving a correction value based on the environmental condition for correcting the control signal.

The engine output torque variation characteristics may be set in terms of a steady state of the engine at a predetermined standard environmental condition. The engine environmental condition indicative data may be atmospheric pressure, and the correction value is derived corresponding to a difference between the atmospheric pressure represented by the engine environmental condition indicative data and a standard pressure defining the predetermined standard environmental condition. Preferably, the correction value is provided as a correction coefficient.

According to another embodiment of the invention, a simulation system for an automotive internal combustion engine, comprises:

a power plant which incorporates a relatively high inertia, and means for compensating the high inertia for achieving a low inertia equivalent to the automotive internal combustion engine;

an engine characteristics generator receiving predetermined engine operation parameter simulated data for deriving a control signal commanding an output torque of the power plant according to a predetermined engine output torque variation characteristic which is set in terms of the engine operation parameter simulated data; and means for generating associated engine operating parameter data other than the predetermined engine operation parameter value.

In the preferred construction, the associated engine operating parameter data is provided as a physical force magnitude. The associated engine operating parameter data may be an intake vacuum pressure simulated corresponding to the simulated engine operating parameter data. The predetermined engine operation parameter simulated data may be engine speed data and a throttle valve open angle data.

According to a further aspect of the invention, a bench testing apparatus for testing an automotive engine associated vehicular component which is controlled at an operational state depending upon preselected control parameters, comprising:

a low inertia engine simulating power plant generating a driving torque simulating engine output, the power plant being cooperated with a sample component to be tested for supplying an engine output simulated driving torque;

an engine characteristics generator receiving predetermined engine operation parameter simulated data for deriving a control signal commanding an output torque of the power plant according to a predetermined engine output torque variation characteristic which is set in terms of the engine operation parameter simulated data; and means, responsive to a simulated environmental condition indicative data representative of the environmental condition of the sample component, for deriving a correction value based on the environmental condition for correcting the control signal.

According to a still further aspect, a bench testing apparatus for testing an automotive engine associated vehicular component which is controlled to an operational state depending upon preselected control parameters, comprises:

a low inertia engine simulating power plant generating a driving torque simulating engine output, the power plant being cooperated with a sample component to be tested for supplying an engine output simulated driving torque;

an engine characteristics generator receiving predetermined engine operation parameter simulated data for deriving a control signal commanding an output torque of the power plant according to a predetermined engine output torque variation characteristics which is set in terms of the engine operation parameter simulated data; and means for generating at least one of the control parameters for controlling the sample component, which one control parameter being associated with a simulated engine operating condition.

According to a yet further aspect of the invention, a bench testing apparatus for testing an automotive engine associated vehicular component which is at a controlled operational state depending upon preselected control parameters, comprises:

a low inertia engine simulating power plant generating a driving torque simulating engine output, the power plant being cooperated with a sample component to be tested for supplying an engine output simulated driving torque;

an engine characteristics generator receiving predetermined first set of engine operation parameter simulated data for deriving a control signal commanding an output torque of the power plant according to a predetermined first engine output torque variation characteristic which is set in terms of the engine operation parameter simulated data, the engine characteristics generator having a second engine output torque variation characteristics set with respect to a second set of engine operating parameter simulated data, in which at least one of data representative of different engine operation parameter simulated data is different from that in the first set; and means for generating at least one of the control parameters for controlling the sample component, which one control parameter being associated with simulated engine operating condition.

According to a further aspect of the invention, a method for simulating operation of an automotive internal combustion engine, comprises the steps of:

generating an engine output torque simulating driving torque by means of a power plant which incorporates a relatively high inertia and means for compensating the high inertia for achieving a low inertia equivalent to the automotive internal combustion engine;

deriving a control signal commanding an output torque of the power plant in terms of given engine simulating parameters according to a predetermined engine output torque variation characteristic which is set in terms of the engine simulating parameters for simulating engine operation at a predetermined engine driving condition represented by the given engine simulating parameters; and deriving a correction value based on the environmental condition for correcting the control signal.

According to a still further aspect of the invention, a method for simulating operation of an automotive internal combustión engine, comprises the steps of:

generating an engine output torque simulating driving torque by means of a power plant which incorporates a relatively high inertia and means for compensating the high inertia for achieving a low inertia equivalent to the automotive internal combustion engine;

deriving a control signal commanding an output torque of the power plant in terms of given engine simulating parameters according to a predetermined engine output torque variation characteristic which is set in terms of the engine simulating parameters for simulating engine operation at a predetermined engine driving condition represented the given engine simulating parameters; and generating associated engine operating parameter data other than the predetermined engine operation parameter value.

According to a still further aspect, a method for testing an automotive engine associated vehicular component which is controlled to an operational state depending upon preselected control parameters, comprises the steps of:

generating a driving torque simulating engine output by means of a low inertia power plant comprising a relatively high inertia and means for compensating the high inertia for achieving a low inertia equivalent to the automotive internal combustion engine;

supplying engine output simulated driving torque to a sample component to be tested for driving the latter;

deriving a control signal commanding an output torque of the power plant in terms of given engine simulating parameters according to a predetermined engine output torque variation characteristics which is set in terms of the engine simulating parameters for simulating engine operation at a predetermined engine driving condition represented by the given engine simulating parameters;

setting a test condition for the sample component and supplying a test condition simulating data; and deriving a correction value based on the environmental condition represented by the testing condition simulating data for correcting the control signal.

According to a yet further aspect, a method for testing an automotive engine associated vehicular component which is controlled to an operational state depending upon preselected control parameters, comprises the steps of:

generating a driving torque simulating an engine output by means of a low inertia power plant comprising a relatively high inertia and means for compensating the high inertia for achieving a low inertia equivalent to the automotive internal combustion engine, supplying an engine output simulated driving torque to a sample component to be tested for driving the latter;

deriving a control signal commanding output torque of the power plant in terms of given engine simulating parameters according to a predetermined engine output torque variation characteristic which is set in terms of the engine simulating parameters for simulating engine operation at a predetermined engine driving condition represented by the given engine simulating parameters; and generating at least one of the control parameters for controlling the sample component, which one control parameter being associated with simulated engine operating condition.

According to a still further aspect, a method for testing testing an automotive engine associated vehicular component which is controlled to an operational state depending upon preselected control parameters, comprises the steps of:

generating a driving torque simulating engine output by means of a low inertia power plant comprising a relatively high inertia and means for compensating the high inertia for achieving a low inertia equivalent to the automotive internal combustion engine, supplying an engine output simulated driving torque to a sample component to be tested for driving the latter;

setting a first engine output torque variation characteristic in terms of a first set of engine operation simulating data;

setting a second engine output torque variation characteristic in terms of a second set of engine operation simulating data including at least one parameter different from those in the first set;

deriving a control signal commanding an output torque of the power plant in terms of given engine simulating parameters according to the engine output torque variation characteristics;

generating at least one of the control parameters for controlling the sample component on the basis of the simulated engine driving condition and the second engine output torque variation characteristics.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 6 is a block diagram of the third embodiment of the automotive engine characteristics simulation system according to the present invention;

DESCRIPTION OF THE PREFERRED EMBODIMENT

Figure 1:
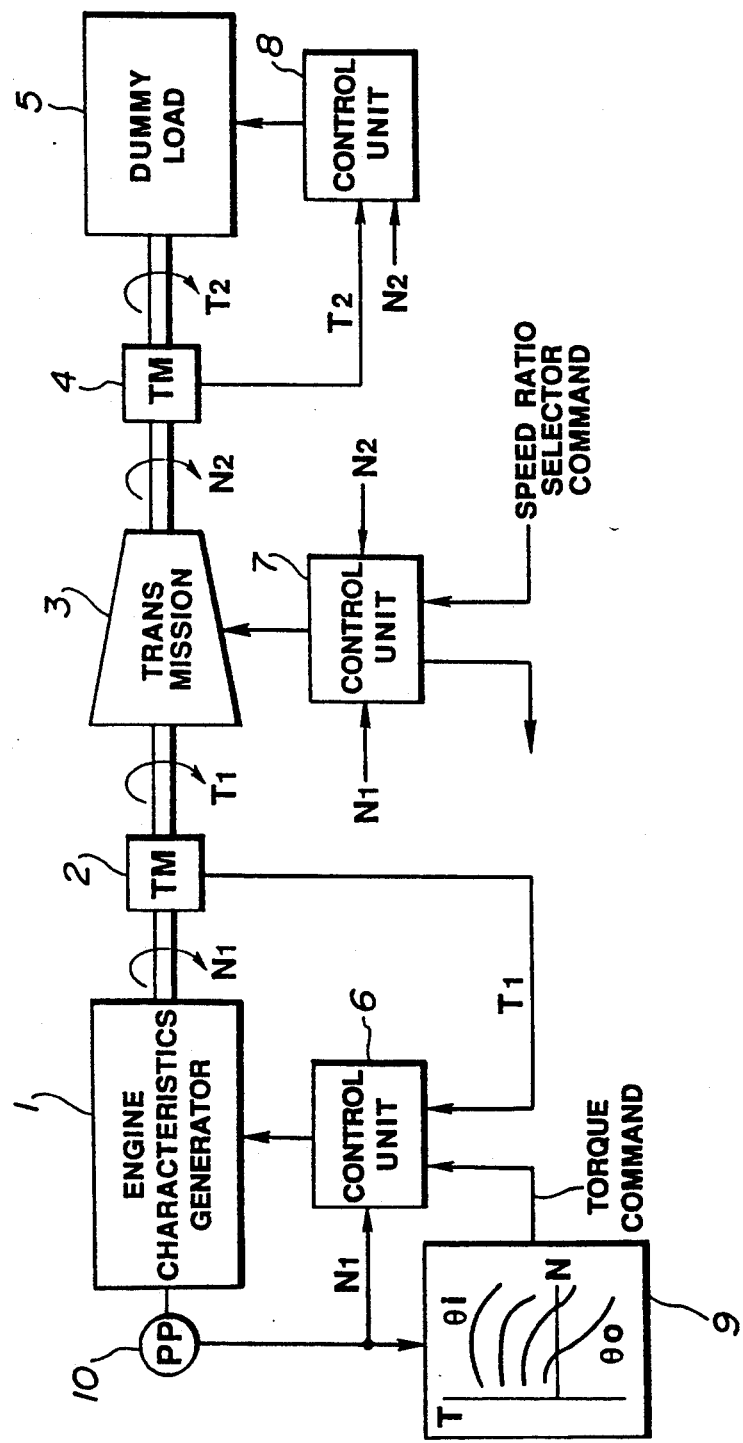
FIG. 1 is a block diagram of the first embodiment of an automotive engine simulation system, according to the present invention.

Referring now to the drawings, particularly to FIG. 1, there is illustrated a dynamometer for bench testing an automotive automatic power transmission utilizing the preferred embodiment of an automotive engine simulation system according to the invention. The shown embodiment of the automatic power transmission employs a low inertia power plant 1. The low inertia power plant 1 comprises a direct current motor which is associated with a thyristor-Leonard type current control minor loop. The direct current motor may be further associated with a speed increasing device for compensating high inertia of the direct current motor. The motor is controlled by current command or torque command generated by the thyristor-Leonard type minor loop. The low inertia power plant has been disclosed in the co-pending U.S. patent application Ser. Nos. 427,031 filed on Oct. 25, 1990, and 436,298 filed on Nov. 13, 1990. The disclosure of the above-identified co-pending U.S. patent application is herein incorporated by reference for the sake of disclosure.

The low inertia power plant 1 has an output shaft which is connected to an automatic power transmission 3 to be tested. Therefore, the automatic power transmission 3 is driven by the output of the low inertia power plant 1. The output shaft of the automatic power transmission 3 is connected to a dummy load 5 via a torque meter 4. As the dummy load 5, a torque absorbing dynamometer 5 including a flywheel is utilized.

For controlling the low inertia power plant 1, the automatic power transmission 3, and the dynamometer 5, respectively separate control units 6, 7 and 8 are provided. For the control unit 6, a torque command or speed command is applied for performing torque or speed control. The control unit 6 also receives a torque indicative signal $T_1$ representative of the output torque of the low inertia power plant 1 from the torque meter 2. Therefore, the control unit 6 performs feedback control of the low inertia power plant 1 by supplying a torque control signal which adjusts the output torque to reduce the difference between the commanded torque indicated in the torque command and the actual output torque indicated in the torque indicative signal $T_1$.

Figure 3:
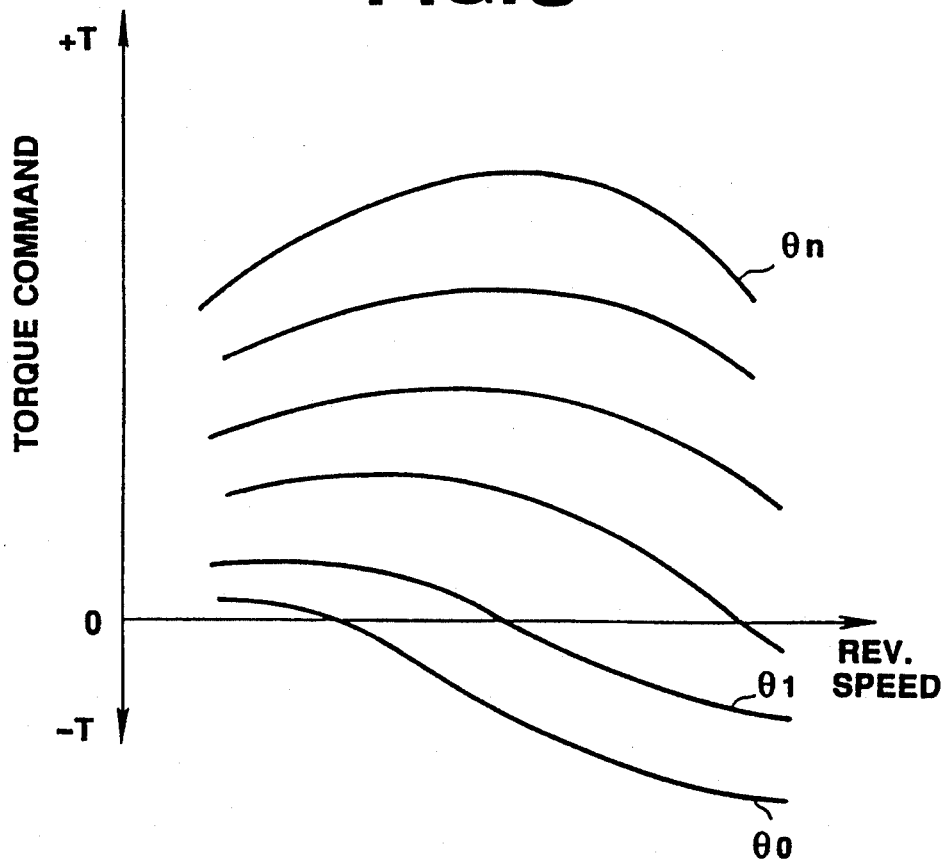
FIG. 3 is a chart showing output characteristics of the engine characteristics simulation system of FIG. 1.

The torque command is generated by the preferred embodiment of an engine characteristics generator 9, according to the invention. The engine characteristics generator 9 comprises a microprocessor based unit. The engine characteristics generator 9 is set to provide output torque characteristics in relation to a revolution speed N, as shown in FIG. 3. As can be seen from FIG. 3, the output torque characteristics are set relative to a respective throttle valve open angle $\theta_i$. Respective output torque characteristics may also be set through experiments. The engine characteristics generator 9 processes the throttle valve open angle data $\theta_i$ and a revolution speed indicative data N which is supplied from a revolution speed sensor 10. On the basis of the throttle valve open angle data $\theta_i$ and a revolution speed indicative data N, the torque command value is derived according to the set output torque characteristics of FIG. 3.

It should be appreciated that, though the shown embodiment employs the throttle valve open angle data $\theta_1$ as an engine load indicative data, an intake air vacuum pressure can be utilized.

Figure 2:
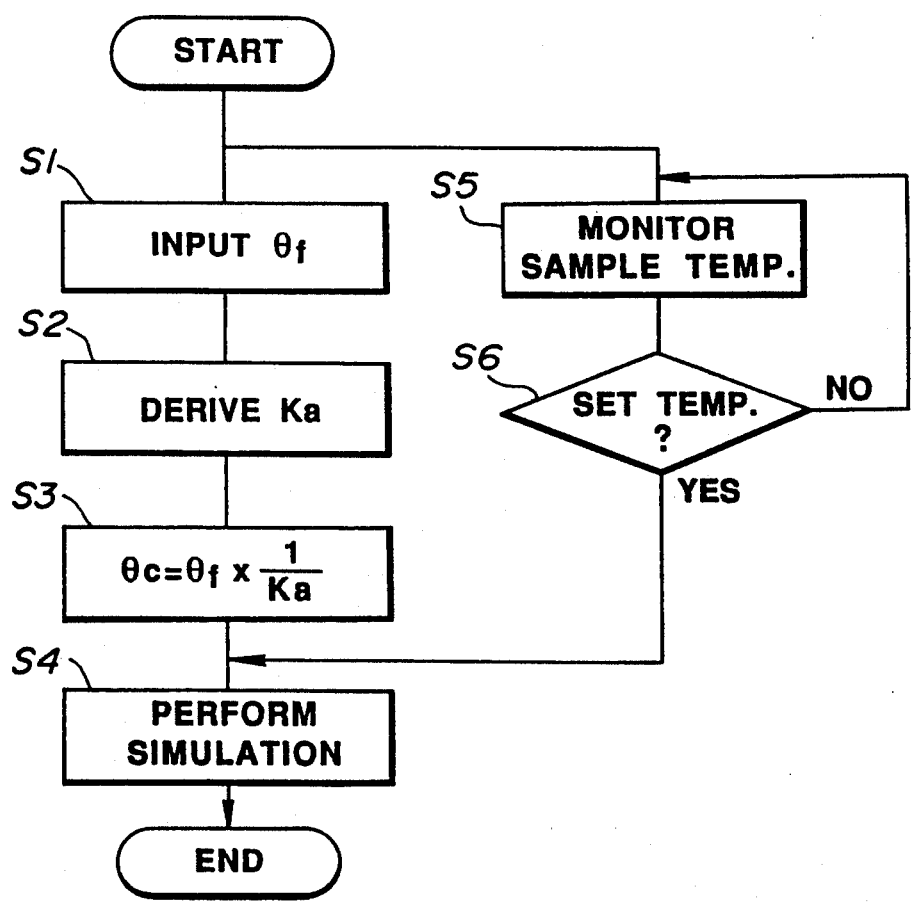
FIG. 2 is a flowchart of a simulation control routine for performing simulation of the engine characteristics.

FIG. 2 shows a flowchart showing operation of the engine characteristics generator 9. For the microprocessor in the engine characteristics generator 9, steady state data $\theta_f$ which corresponds to the engine output characteristics at a constant open angle of the throttle valve at a predetermined standard engine condition is input, at a step $S_1$. The steady state data $\theta_1$ corresponds to the characteristics of $\theta_0$ to $\theta_n$ in FIG. 3. These steady state data are set on the basis of the engine performance test data under standard atmospheric pressure. It is also possible to set the steady state data $\theta_1$ by arithmetically correcting the test data in terms of the atmospheric test condition so as to obtain the data under standard atmospheric condition. Arithmetic correction may be performed according to the following equation as defined in JIS D1001-1982:

$$T_0 = K_a T_e \quad (1)$$

$$K_a = \{P_o/(P_a - P_w)\}^{1.2} \times \{(273 + t_d)/(273 + t_0)\}^{0.8} \quad (2)$$

wherein
 $T_0$ is corrected output torque;
 $K_a$ is correction coefficient S;
 $T_e$ is standard torque data;
 $P_o$ is standard dry-bulb pressure;
 $P_a$ is total atmospheric pressure;
 $P_w$ is vapor composite pressure in atmosphere;
 $t_d$ is intake air temperature; and
 $t_o$ is standard atmospheric temperature (25° C.)

As can be appreciated herefrom, the corrected output torque can be obtained by correcting the standard torque data with the correction coefficient.

At a step $S_2$, environment setting data for defining a testing environmental condition is input. Practically, the environment setting data represents the pressure data $P_o$. Based on the input pressure data $P_o$, the correction coefficient $K_a$ is derived. Subsequently, at a step $S_3$, the steady saté data $\theta_f$ are corrected. Practically, correction for the steady state data is performed by multiplying $1/K_a$ for the steady state data $\theta_f$ $$\theta_c = \theta_f \times (1/K_a) \quad (3)$$

By the correction set forth above, respective data of the steady state data $\theta_f$ set in the step $S_1$ are modified to be adapted to the set testing condition. Therefore, by inputting desired testing condition data ($P_o$), any desired testing condition can be simulated. At a step $S_4$, engine output characteristics simulation is performed by supplying the torque command to the control unit 6 set forth above. Therefore, in the shown embodiment, a bench test of the automatic power transmission can be performed at any desired test conditions.

For further precision of the bench test of the automatic power transmission, it is desirable to set the testing condition including a temperature condition. However, since the influence of atmospheric pressure and temperature for performance of the automatic power transmission is substantially small, it would be sufficient to incorporate the factor of temperature condition in the test condition. Therefore, in the shown process, environmental temperature of the automatic power transmission is temporarily adjusted to a desired testing temperature by means of a cooler, heater or air conditioner unit, at a step $S_5$. Then, at a step $S_6$, testing temperature at the environment of the automatic power transmission to be tested, is set. By this, a further precise bench test for the automatic power transmission can be performed.

In case of an automatic power transmission which employs an intake vacuum pressure as one of the shift control parameters, it is essential to simulate an intake vacuum pressure according to the driving condition of the low inertia power plant 1. A system for bench testing the automatic power transmission which requires the intake vacuum pressure data for shifting control, is illustrated in FIG. 4 in a form of simplified block diagram.

Figure 4:
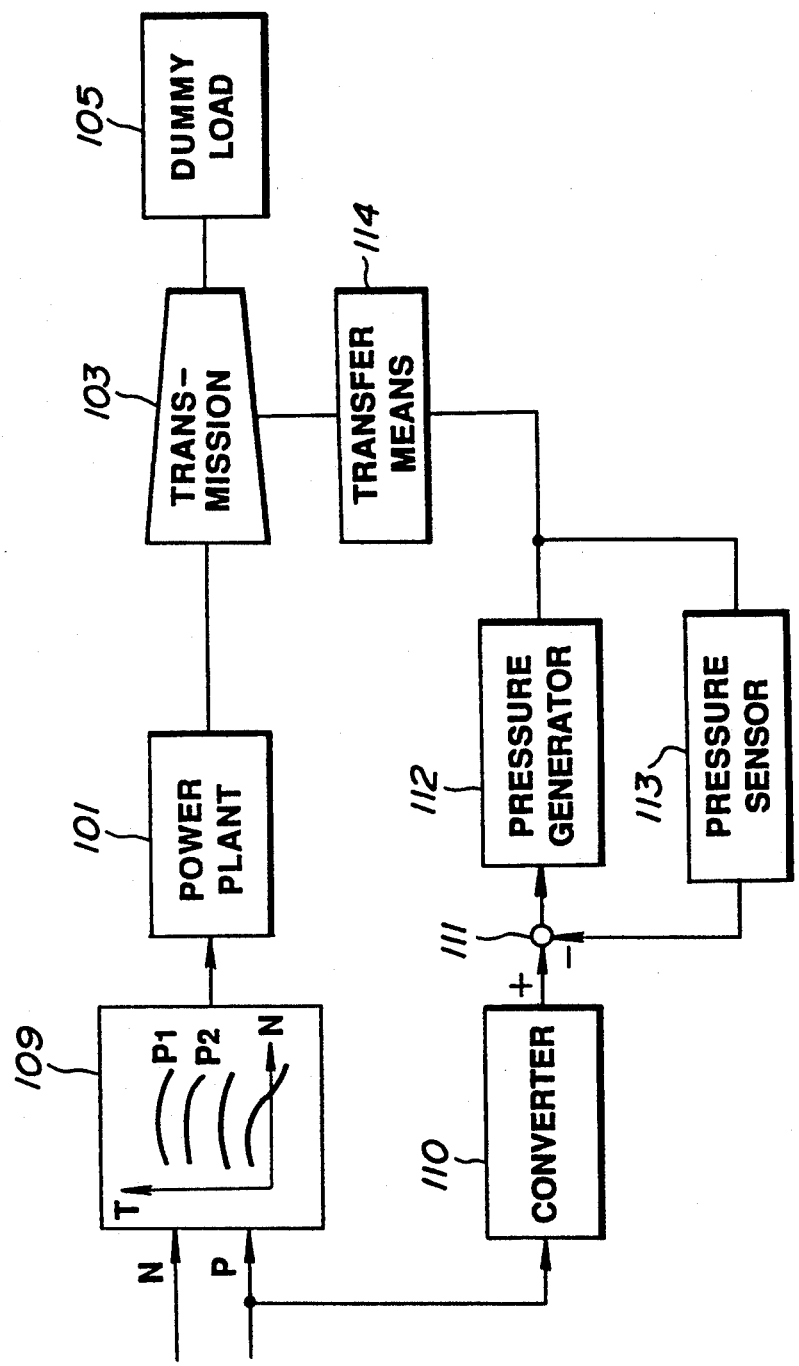
FIG. 4 is a block diagram of the second embodiment of the automotive engine characteristics simulation system according to the present invention.

As can be seen from FIG. 4, a low inertia power plant 101 has a similar construction as discussed with respect to the former embodiment. Namely, the low inertia power plant 101 employs an electric motor as a prime mover. The low inertia power plant 101 is controlled by an engine characteristics generator 109. For simulating the engine operation, the engine characteristics generator 109 is supplied with an engine speed indicative data N and an intake vacuum pressure indicative data P. As can be seen, the engine characteristics generator 109 is set at a plurality of engine output characteristics $P_1$, $P_2$ . . . variable in relation to the engine speed N. The engine characteristics generator 109 derives a torque command to control operation of the low inertia power plant 101.

The low inertia power plant 101 is connected to the automatic power transmission 103 to be tested for supplying the engine output simulated output torque. The automatic power transmission 103 is connected to a dummy load 105 to supply thereto the output torque.

The intake vacuum pressure P is supplied to a converter 110. The converter 110 converts the intake vacuum indicative data P into a depression force indicative data. The converter 110 outputs the depression force indicative data to an adder 111. The adder 111 is connected to a pressure generator 112 which generates a simulated pressure corresponding to the intake vacuum pressure at the simulated engine operating condition. The simulated pressure generated by the pressure generator 112 is monitored by a pressure sensor 113. The pressure sensor 113 generates a simulated pressure indicative signal to be fedback to the adder 111. The adder 111 receives the depression force indicative data at a non-inverting input and the fedback simulated pressure indicative signal at an inverting input. Therefore, the adder 111 supplies a difference signal representative of the difference between the depression force indicative data and the simulated pressure indicative signal.

Figure 5:
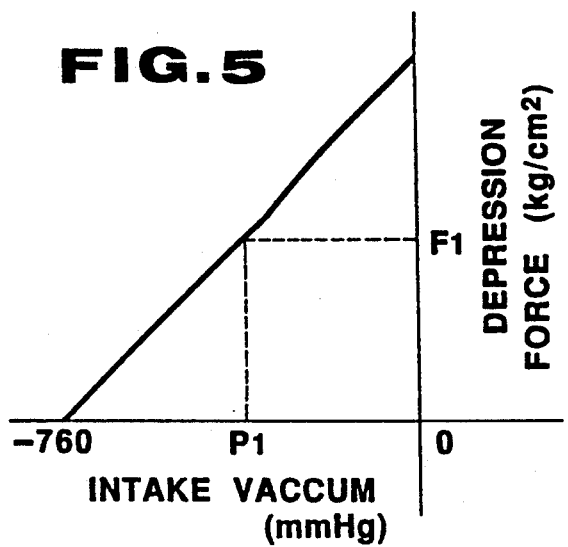
FIG. 5 is a chart showing variation of a simulated pressure and intake air pressure.

As shown in FIG. 5, the depression force indicative data is set in relation to the intake vacuum pressure. Namely, as can be seen from FIG. 5, the depression force F ($kg/cm^2$) is increased according to a decreasing of the intake vacuum pressure P. The pressure generator 112 comprises a pressure generating actuator which is constituted of a pressure controller and a master cylinder for generating a fluid pressure, such as a hydraulic pressure, at the magnitude corresponding to the value of the depression force indicative data. The pressure thus generated is transferred to the automatic power transmission to be tested via a pressure transferring means 114, such as an output shaft of the pressure generator 112 for which the generated pressure is exerted.

FIG. 6 shows the third embodiment of the bench testing system including the preferred embodiment of the engine characteristics simulation system, according to the present invention. The shown embodiment is designed to adapted the engine characteristics simulation system to various types of automatic power transmissions having mutually different shift control parameters.

Figure 7:
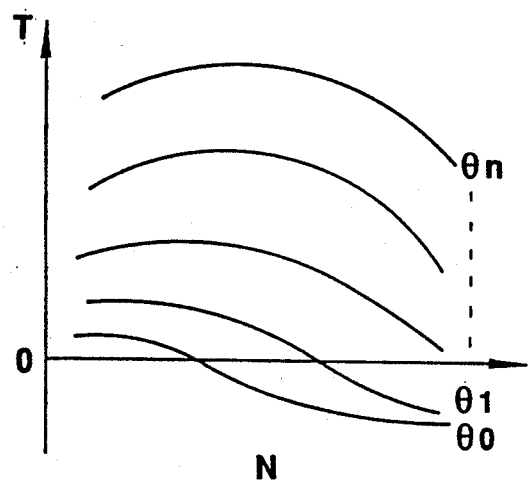
FIGS. 7 and 8 are charts showing different engine characteristics.
Figure 8:
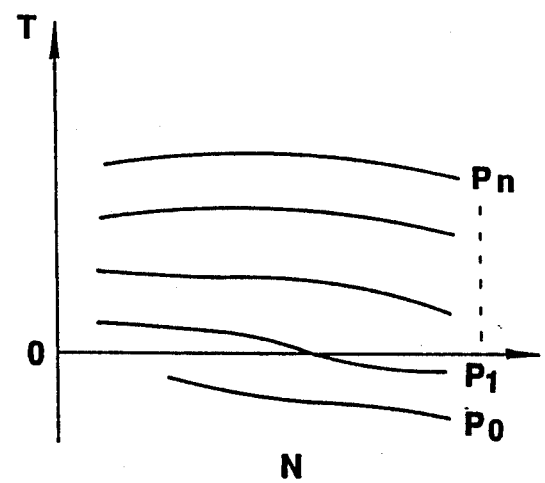
Figure 9:
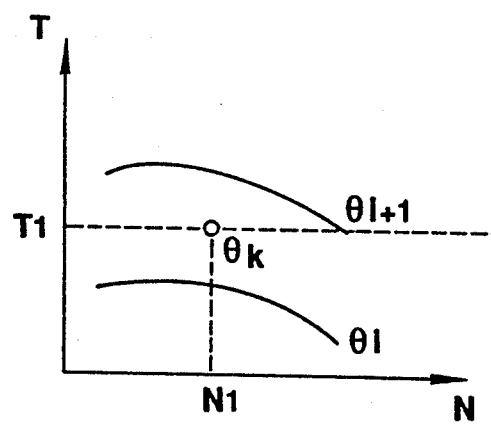
FIGS. 9 and 10 are explanatory charts showing the manner of derivation of an intake air pressure indicative parameter.
Figure 10:
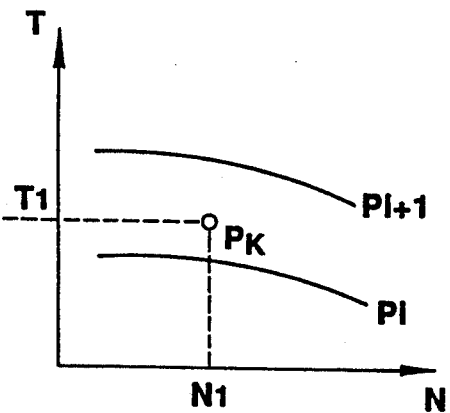

In the shown embodiment, the low inertia power plant 201 receives the torque command from an engine characteristics generator 209. The engine characteristics generator 209 is associated with a plurality of data storages $209_1$, $209_2$, $209_3$... Respective ones of the data storage store engine output torque variation characteristics set with respect to different parameters. In the shown example, the data storage $209_1$ stores the engine output torque data set in terms of the throttle valve open angle $\theta$ and the engine speed N, as shown in FIG. 7. On the other hand, the data storage $209_2$ stores the engine output torque data set in terms of the intake vacuum pressure P and the engine speed N, as shown in FIG. 8. The engine characteristics generator 209 receives the engine speed indicative data N and the throttle valve open angle data $\theta$. Therefore, basic simulated engine output torque data is derived on the basis of the engine output torque variation characteristics stored in the data storage $209_1$. For example, as seen from FIG. 9, assuming that the throttle valve open angle is $\theta_k$ and the engine speed is $N_1$, the simulated engine output torque becomes $T_1$, as seen from FIG. 9. On the other hand, when the simulated engine output torque is $T_1$ and the engine speed N is N, the corresponding intake vacuum pressure data $P_k$ can be derived from the engine output variation characteristics stored in the data storage $209_2$.

Therefore, the engine characteristics generator 209 can output the intake air pressure indicative data P in addition to the torque command T.

In the shown embodiment, the torque command T generated by the engine characteristics generator 209 is supplied to the low inertia power plant 201 for controlling the output torque of the latter. The engine characteristics generator 209 further outputs the intake vacuum indicative data to a pressure generating actuator 210 which may be the same construction to that in the former embodiment. Therefore, the pressure corresponding to the intake vacuum pressure can be supplied to the automatic power transmission 203 connected to the dummy load 205. Therefore, in the shown embodiment, a bench test for the automatic power transmission 203 is enabled even when the parameters used for shift control are different from those input to the engine characteristics generator 209.

As can be clear from the above, the present invention successfully simulates the automotive internal combustion engine. Also, the present invention enables bench testing for the automatic power transmissions even when the parameters to be used for controlling shifting of the transmission gear ratio are different from that supplied to the engine characteristics generator.

While the present invention has been discussed in terms of the preferred embodiments of the invention, the invention may be embodied in various ways. Therefore, the invention should be interpreted to include all possible embodiments and modifications which can be implemented without departing from the principle of the invention.

What is claimed is:

1. A simulation system for an automotive internal combustion engine applicable to a testing of a vehicular power transmission, comprising:
   a power plant which incorporates a relatively high revolution inertia and having means for compensating said high inertia for achieving a low inertia substantially equivalent to the automotive internal combustion engine;
   an engine characteristics generator for receiving predetermined engine operation parameter simulated data and for deriving a control signal for commanding an output torque of said power plant according to a predetermined engine output torque variation characteristic which is set in terms of said engine operation parameter simulated data; and
   means responsive to a simulated engine environmental condition indicative data for deriving a correction value based on an environmental condition for correcting said control signal.

2. A simulation system as set forth in claim 1, wherein said engine output torque variation characteristic is set in terms of a steady state of the engine at a predetermined standard environmental condition.

3. A simulation system as set forth in claim 2, wherein said engine environmental condition is atmospheric pressure, and said correction value is derived corresponding to a difference between an atmospheric pressure represented by said engine environmental condition indicative data and a standard pressure defining said predetermined standard environmental condition.

4. A simulation system as set forth in claim 3, wherein said correction value is provided as a correction coefficient.

5. A simulation system for an automotive internal combustion engine applicable to a testing of a vehicular power transmission, comprising:
- a power plant which incorporates a relatively high inertia and means for compensating said high inertia for achieving a low inertia equivalent to the automotive internal combustion engine;
- an engine characteristics generator for receiving predetermined engine operation parameter simulated data and for deriving a control signal for commanding an output torque of said power plant according to a predetermined engine output torque variation characteristic which is set in terms of said engine operation parameter simulated data; and
- means for generating associated engine operating parameter data in addition to said predetermined engine operation parameter simulated data.

6. A simulation system as set forth in claim 5, wherein said associated engine operating parameter simulated data is provided as a physical force magnitude.

7. A simulation system as set forth in claim 6, wherein said associated engine operating parameter simulated data is an intake vacuum pressure simulated corresponding to the engine operating parameter simulated data.

8. A simulation system as set forth in claim 7, wherein said predetermined engine operation parameter simulated data are an engine speed data and a throttle valve open angle data.

9. A method for simulating operation of an automotive internal combustion engine, comprising the steps of:
- generating an engine output torque simulating driving torque by means of a power plant which incorporates a relatively high inertia and means for compensating said high inertia for achieving a low inertia equivalent to the automotive internal combustion engine;
- deriving a control signal for commanding an output torque of said power plant in terms of given engine simulating parameters according to a predetermined engine output torque variation characteristic which is set in terms of said engine simulating parameters for simulating engine operation at a predetermined engine driving condition represented by said given engine simulating parameters; and
- deriving a correction value based on an environmental condition for correcting said control signal.

10. A method for testing an automotive engine associated vehicular component which has a controlled operational state depending upon preselected control parameters, comprising the steps of:
- generating a simulated engine driving torque output by means of a low inertia power plant comprising a relatively high inertia and means for compensating said high inertia for achieving said low inertia which is equivalent to the automotive internal combustion engine;
- supplying said simulated engine driving torque output to said associated vehicular component to be tested for driving the latter;
- deriving a control signal for commanding said driving torque of said power plant in terms of given engine simulating parameters according to a predetermined engine output torque variation characteristic which is set in terms of said engine simulating parameters for simulating engine operation at a predetermined engine driving condition represented by said given engine simulating parameters;
- setting a test condition for said associated vehicular component and supplying a test condition simulating data; and
- deriving a correction value based on an environmental condition represented by said test condition simulating data for correcting said control signal.

11. A method for simulating operation of an automotive internal combustion engine, comprising the steps of:
- generating an engine output torque simulating driving torque by means of a power plant which incorporates a relatively high inertia and means for compensating said high inertia for achieving a low inertia equivalent to the automotive internal combustion engine;
- deriving a control signal for commanding an output torque of said power plant in terms of given engine simulating parameters according to a predetermined engine output torque variation characteristic which is set in terms of said engine simulating parameters for simulating engine operation at a predetermined engine driving condition represented by said given engine simulating parameters; and
- generating associated engine operating parameter data in addition to said predetermined engine operation parameter value.

12. A bench testing apparatus for testing an automotive engine associated vehicular component which has a controlled operational state depending upon preselected control parameters, comprising:
- a low inertia engine simulating power plant generating a driving torque simulating engine output, said power plant being cooperated with said associated vehicular component to be tested for supplying said driving torque;
- an engine characteristics generator for receiving predetermined engine operation parameter simulated data and for deriving a control signal for commanding an output torque of said power plant according to a predetermined engine output torque variation characteristic which is set in terms of said engine operation parameter simulated data; and
- means responsive to a simulated environmental condition indicative data representative of an environmental condition of said associated vehicular component for deriving a correction value based on said environmental condition for correcting said control signal.

13. A bench testing apparatus as set forth in claim 12, wherein said engine output torque variation characteristics is set in terms of a steady state of the engine at a predetermined standard environmental condition.

14. A bench testing apparatus as set forth in claim 13, wherein said environmental condition is atmospheric pressure, and said correction value is derived corresponding to a difference between an atmospheric pressure represented by said simulated environmental condition indicative data and a standard pressure defining said predetermined standard environmental condition.

15. A simulation system as set forth in claim 14, wherein said correction value is provided as a correction coefficient.

* * * * *